(12) United States Patent
Baldwin et al.

(10) Patent No.: US 8,981,217 B1
(45) Date of Patent: Mar. 17, 2015

(54) STACKABLE LIKE-GANGED ELECTRICAL BOXES

(71) Applicant: Hubbell Incorporated, Shelton, CT (US)

(72) Inventors: Jeffrey P. Baldwin, Phoenix, AZ (US); Richard L. Cleghorn, Carlsbad, CA (US); Iven Dieterle, Taipei (TW); Marcus J. Shotey, Scottsdale, AZ (US)

(73) Assignee: Hubbell Incorporated, Shelton, CT (US)

( * ) Notice: Subject to any disclaimer, the term of this patent is extended or adjusted under 35 U.S.C. 154(b) by 170 days.

(21) Appl. No.: 13/653,354

(22) Filed: Oct. 16, 2012

Related U.S. Application Data

(63) Continuation of application No. 12/793,634, filed on Jun. 3, 2010, now Pat. No. 8,288,650.

(60) Provisional application No. 61/183,916, filed on Jun. 3, 2009.

(51) Int. Cl.
*H05K 5/00* (2006.01)

(52) U.S. Cl.
USPC .......... 174/50; 174/53; 174/58; 439/535; 248/906

(58) Field of Classification Search
USPC .......... 174/50, 53, 58; 439/535; 248/906; 220/4.02
See application file for complete search history.

(56) References Cited

U.S. PATENT DOCUMENTS 7,273,392 B2 * 9/2007 Fields .................. 439/535

* cited by examiner

*Primary Examiner* — Dhirubhai R Patel
(74) *Attorney, Agent, or Firm* — Roylance, Abrams, Berdo & Goodman, L.L.P.

(57) ABSTRACT

A method and structure of a system of electrical boxes having at least two screw boss channels and at least two screw protrusions wherein the screw boss channels are complimentary shaped to the screw protrusions for selectively nesting like-ganged electrical boxes while preventing nesting of dislike-ganged electrical boxes for more space-efficient storage of electrical boxes while increasing inventory control and accuracy.

20 Claims, 6 Drawing Sheets

STACKABLE LIKE-GANGED ELECTRICAL BOXES

CROSS REFERENCE TO RELATED APPLICATIONS

This application is a Continuation of earlier U.S. patent application Ser. No. 12/793,634 to Baldwin et al. entitled "Stackable Like-Ganged Electrical Boxes" which was filed on Jun. 3, 2010, now U.S. Pat. No. 8,288,650, which application claims the benefit of the filing date of U.S. Provisional Patent Application 61/183,916 to Baldwin et al. entitled "Stackable Like-Ganged Electrical Boxes" which was filed on Jun. 3, 2009, the disclosures of which are hereby incorporated herein by reference.

BACKGROUND OF THE INVENTION

1. Technical Field

Aspects and implementations of this document relate generally to electrical boxes. Particular implementations include electrical boxes designed to be nested with each other in a variety of ways (e.g., vertically stacked in a nested configuration) for storage, shipment, and the like while preventing nesting of certain electrical boxes that, for example, may have a different numbers of gangs.

2. Background Art

Electrical boxes are well known in the art of the electrical installation aspects of construction to house electrical components of such things as switches and receptacles. Conventional electrical boxes are typically one-piece structures with external features that make them somewhat voluminous. Therefore, it is desirable to improve the storability, portability and shipability of electrical boxes by providing electrical boxes designed to be nested and stacked allowing the boxes to be maintained in as minimal a space as possible.

There are multiple variations of electrical box designs known in the art including designs that accommodate any number of wires and wiring gauges, include external features to facilitate mounting or securing to external construction or other characteristics. Features of electrical boxes typically facilitate installation and improve functionality of the electrical box but these features may also make compact storage of groups of electrical boxes difficult.

SUMMARY

This disclosure includes one or more electrical box designs that do not impact the installation capabilities or features of an electrical box but allow nesting to reduce the amount of space required to store, carry or ship multiple boxes. A particular implementation employs complementary shaped screw protrusions and screw boss channels for a first set of electrical boxes which are designed to nest within one another while utilizing an incompatible screw protrusion and screw boss channel for a second set of electrical boxes that are intended to nest within one another but not with the first set of electrical boxes.

A particular embodiment broadly comprises a system of electrical boxes comprising first and second similarly sized electrical boxes each comprising at least four sides extending from a bottom to an open top and at least two box mounting screw protrusions each having an aperture adjacent to each of at least two opposing sides, each box mounting screw aperture comprising an opening extending toward the open top of the first electrical box, at least two screw boss channels adjacent to each of the at least two opposing sides and complementary shaped and sized to receive the at least two box mounting screw protrusions when the first electrical box is at least partially nested within the second electrical box, and a third electrical box comprising at least four sides extending from a bottom to an open top and at least two box mounting screw protrusions each having an aperture adjacent to each of at least two opposing sides, each box mounting screw aperture comprising an opening extending toward the open top of the third electrical box, at least two screw boss channels adjacent to each of the at least two opposing sides and shaped or sized to prevent receiving the at least two box mounting screw protrusions of the first and second electrical boxes.

Another particular embodiment broadly comprises a system of electrical boxes comprising a first electrical box having at least two box mounting screw protrusions and at least two screw boss channels complementary shaped and sized to receive the first electrical box at least two box mounting screw protrusions, a second electrical box having at least two box mounting screw protrusions and at least two screw boss channels complementary shaped and sized to receive the second electrical box at least two box mounting screw protrusions, a third electrical box having at least two box mounting screw protrusions and at least two screw boss channels complementary shaped and sized to receive the third electrical box at least two box mounting screw protrusions, a fourth electrical box having at least two box mounting screw protrusions and at least two screw boss channels complementary shaped and sized to receive the fourth electrical box at least two box mounting screw protrusions and, wherein the first electrical box mounting screw protrusions prevent nesting with the second, third, and fourth electrical boxes at least two screw boss channels, wherein the second electrical box mounting screw protrusions prevent nesting with the first, third, and fourth electrical boxes at least two screw boss channels, wherein the third electrical box mounting screw protrusions prevent nesting with the first, second, and fourth electrical boxes at least two screw boss channels and, wherein the fourth electrical box mounting screw protrusions prevent nesting with the first, second, and third electrical boxes at least two screw boss channels.

Still another particular embodiment broadly comprises a method of stacking like-ganged electrical boxes comprising providing a first plurality of first electrical boxes having a first number of gangs and each comprising complementary shaped box mounting screw protrusions and screw boss channels, providing a first plurality of second electrical boxes having a second number of gangs and each comprising complementary shaped box mounting screw protrusions and screw boss channels, stacking the first plurality of first electrical boxes together in a nested manner, stacking the second plurality of second electrical boxes together in a nested manner and, preventing nesting of the first plurality of first electrical boxes with the second plurality of second electrical boxes by aligning the first electrical box screw boss channels with the second electrical box mounting screw protrusions.

Aspects and applications presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

BRIEF DESCRIPTION OF THE DRAWINGS

Features of particular embodiments and implementations of electrical boxes will hereinafter be described in conjunction with the appended drawings, where like designations denote like elements, and.

DETAILED DESCRIPTION

At the outset, it should be appreciated that like drawing numbers on different views identify identical, or functionally similar, structural elements. While the present inventions may be described with respect to what is presently considered to be the preferred embodiments, it is to be understood that the invention as claimed is not limited to the disclosed aspects.

This disclosure, its aspects and implementations, are not limited to the specific components or assembly procedures disclosed herein. Many additional components and assembly procedures known in the art consistent with the intended electrical boxes and/or assembly procedures for electrical boxes may be used and will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such electrical boxes and implementing components, consistent with the intended operation and purpose of electrical boxes. As used herein, "electrical boxes" is intended to specifically refer to the types of electrical boxes that are mounted within a wall structure and to which small electrical devices such as electrical switches and electrical receptacles are mounted using box mounting device screws.

Figure 1:
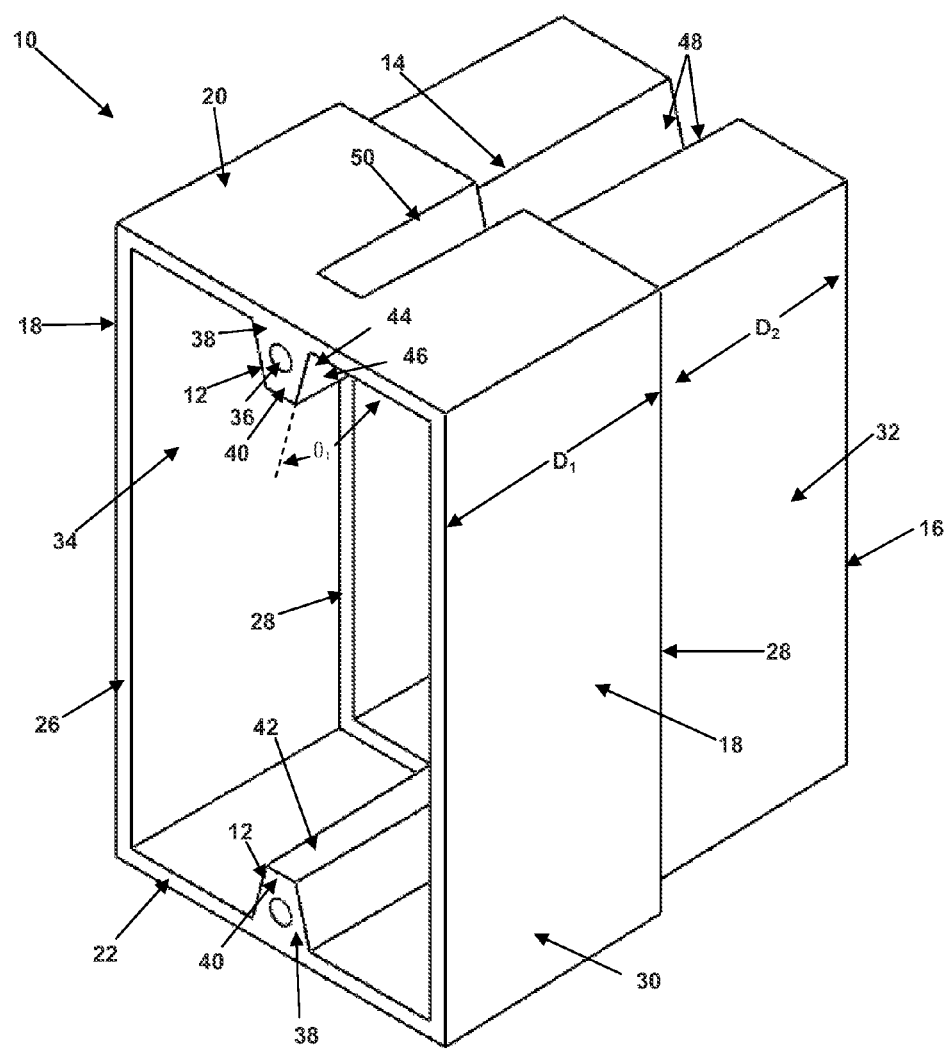
FIG. 1 is a perspective view of a preferred embodiment single-gang electrical box.

Accordingly, there are a variety of electrical box implementations. FIG. 1 illustrates a preferred embodiment single-gang electrical box 10 with a pair of box mounting screw protrusions 12 and a pair of screw boss channels 14 on the top and bottom. Specifically, electrical box 10 includes a back wall 16 with side walls 18, a top wall 20, and a bottom wall 22 extending forward therefrom. Side walls 18, top wall 20, and bottom wall 22 define a cavity 24 extending to a front surface 26 of the electrical box.

At approximately a mid-point, a shoulder 28 is formed in side walls 18, top wall 20, and bottom wall 22. Shoulder 28 functions to limit how far the electrical boxes nest within one another. In particular, electrical box 10 includes a front portion 30 which is larger than a rear portion 32. Front portion 30 has a depth D1, while rear portion 32 has a depth of D2. This arrangement allows the front portion 30 and cavity 24 to receive rear portion 32 during the nesting operation. The nesting depth can also be varied by modifying the position of shoulder 28 so that depths D1 and D2 are changed.

In accordance with one of the main features of this embodiment, screw protrusions 12 extend inward from an inner surface 34 at least partially defining cavity 24. Protrusions 12 may include through hole 36 that extends from front surface 26 and into screw boss channels 14. Through hole 36 is used to mount an electrical device, such as a light switch, a Ground Fault Circuit Interrupter (GFCI), a duplex outlet, or any other suitable electrical device.

Screw protrusions 12 also include a proximate portion 38 and a distal portion 40. Proximate portion 38 is preferably located adjacent inner surface 34 and either top wall 20 or bottom wall 22, respectively. Distal portion 40 may extend further inward from proximate portion 38 and terminates at an end 42 which defines the innermost position of each screw protrusion. The screw protrusions also have a sidewall 44 defining a portion of an outer surface 46 of the screw protrusion. Sidewall 44 of screw protrusion 12 is disposed at an angle $\theta_1$ with respect to top wall 20. Finally, screw protrusions 12 may extend from front surface 26 until shoulder 28 and beyond if necessary.

Screw boss channels 14 are complementary shaped to receive screw protrusions 12 of a single-gang electrical box 10 and provide the requisite nesting function. Channels 14 are formed on top wall 20 and bottom wall 22 in this embodiment to match the location of screw protrusions 12. However, it is within the spirit and scope of this disclosure to locate both screw boss channels 14 and screw protrusions 12 on any wall of the electrical box.

Screw boss channels 14 include angled walls 48 that are shaped and sized similar to the outer periphery of screw protrusions 12 and strategically located to accept the same. Channels 14 may extend for the full length of D2, or rear portion 32, terminating near shoulder 28 and back wall 16. A secondary channel 50 may be the same size or reduced in size to provide an aesthetically pleasing box.

In the embodiment illustrated in FIG. 1, screw boss channels 14 of the single-gang electrical box 10 are shaped and sized complementary to screw protrusions 12 of the single-gang electrical box so that each single-gang electrical box can be nested within each other. Specifically, angle $\theta_1$ of the screw protrusions matches the angle of angled walls 48 while also matching the cross-sectional dimensions of each other. Advantageously, this complementary shaped protrusion and channel provides space saving functions while ensuring that only single-gang electrical boxes are stacked together, thereby also increasing inventory accuracy.

Figure 2:
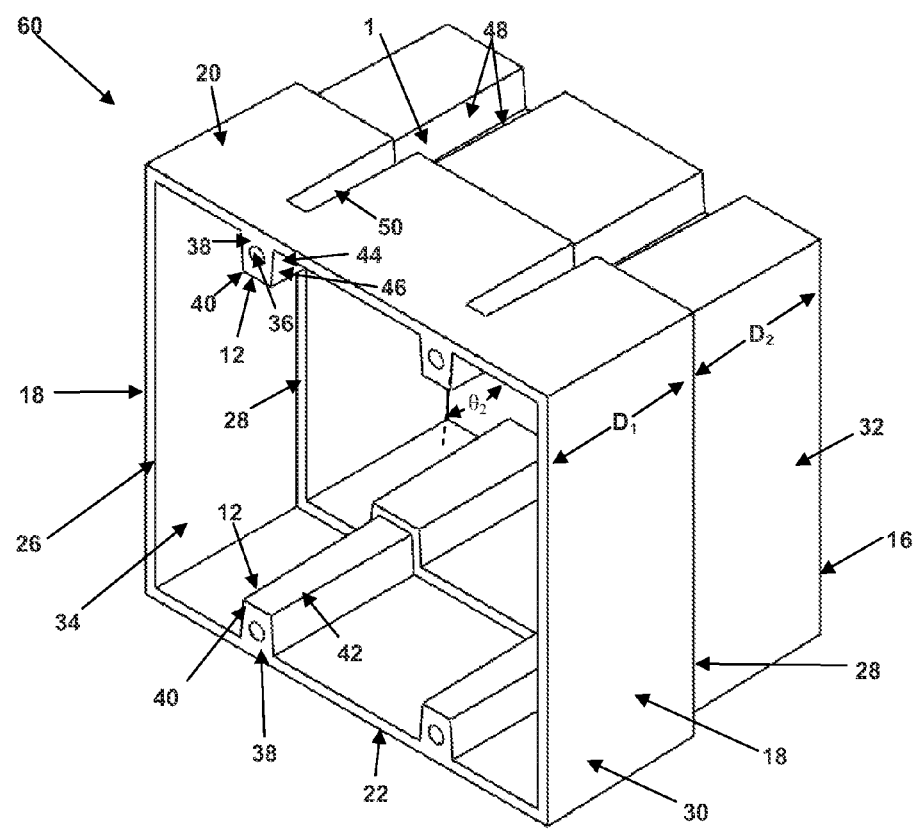
FIG. 2 is a perspective view of a preferred embodiment dual-gang electrical box.

Referring now to FIG. 2, a double-gang electrical box 60 is shown with four screw protrusions 12 extending inward from top wall 20 and bottom wall 22. Specifically, two screw protrusions 12 extend downward from an inner surface 34 of top wall 20, while two additional screw protrusions 12 extend upward from an inner surface 34 of bottom wall 22. Additionally, a pair of screw boss channels 14 are formed in top wall 20 and a second pair of screw boss channels 14 are formed in bottom wall 22.

Similar to single-gang electrical box 10, screw protrusions 12 and screw boss channels 14 of the double-gang electrical box 60 are shaped and sized complementary to one another to allow double-gang electrical box screw protrusions to slidingly engage double-gang electrical box screw boss channels. In particular, double-gang screw protrusions 12 also include sidewall 44 with outer surface 46. Nevertheless, an angle $\theta_2$ defined as the angle between sidewall 44 and top wall 20 or bottom wall 22 of the double-gang electrical box is less than $\theta_1$ and therefore the cross-sectional shape and size of double-gang screw protrusions 12 are different than a single-gang screw protrusion. Still further, the double-gang screw boss channel 14 is adapted to match and receive screw protrusions having an angle $\theta_2$. Accordingly, only a double-gang screw protrusion can fit within a double-gang screw boss channel and cannot be nested within a single-gang, a triple-gang, or a 4-gang electrical box (as discussed below).

Figure 3:
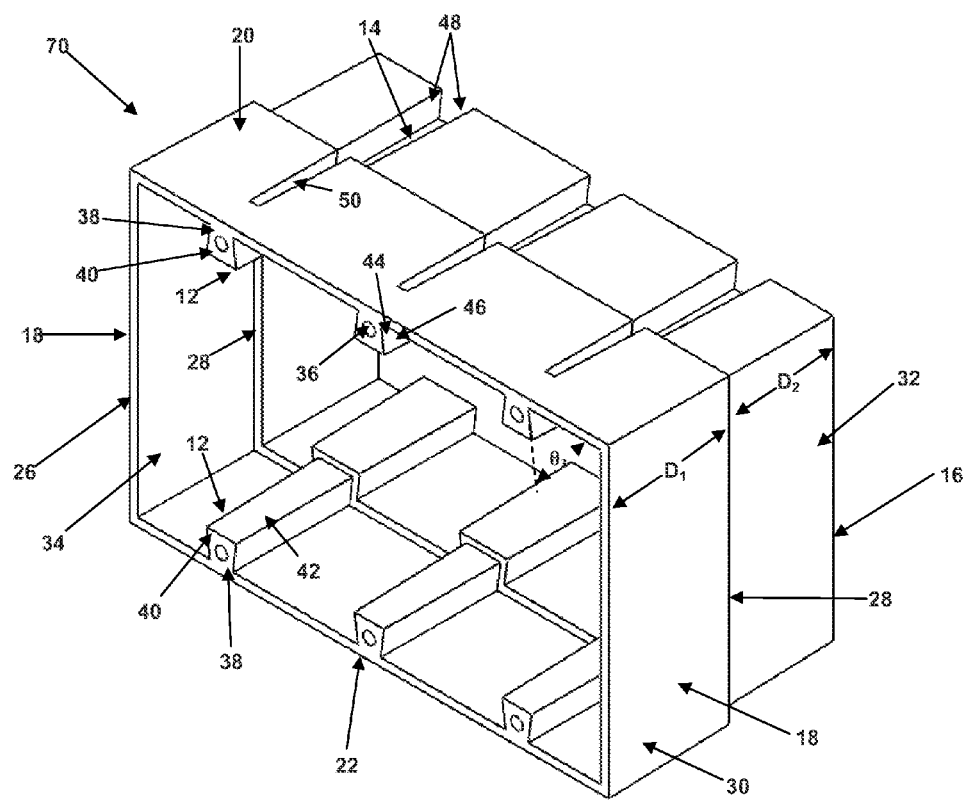
FIG. 3 is perspective view of a preferred embodiment triple-gang electrical box.

Referring to FIG. 3, a triple-gang electrical box 70 is shown with six screw protrusions 12 extending inward from top wall 20 and bottom wall 22. Specifically, three screw protrusions 12 extend downward from an inner surface 34 of top wall 20, while three additional screw protrusions 12 extend upward from an inner surface 34 of bottom wall 22. Additionally, three screw boss channels 14 are formed in top wall 20 and three additional screw boss channels 14 are formed in bottom wall 22.

Similar to single-gang electrical box 10 and double-gang electrical box 60, screw protrusions 12 and screw boss channels 14 of triple-gang electrical box 70 are shaped and sized complementary to one another to allow triple-gang electrical box screw protrusions to slidingly engage triple-gang electrical box screw boss channels. In particular, triple-gang screw protrusions 12 also include sidewall 44 with outer surface 46. Nevertheless, an angle $\theta_3$ defined as the angle between sidewall 44 and top wall 20 or bottom wall 22 of the triple-gang electrical box is less than $\theta_1$ and $\theta_2$ and therefore the cross-sectional shape and size of triple-gang screw protrusions 12 are different from both the single-gang screw protrusion and the double-gang screw protrusion. Still further, the triple-gang screw boss channel 14 is adapted to match and receive screw protrusions having an angle $\theta_3$. Accordingly, only a triple-gang screw protrusion can fit within a triple-gang screw boss channel and cannot be nested within a single-gang, a double-gang, or a 4-gang electrical box.

Figure 4:
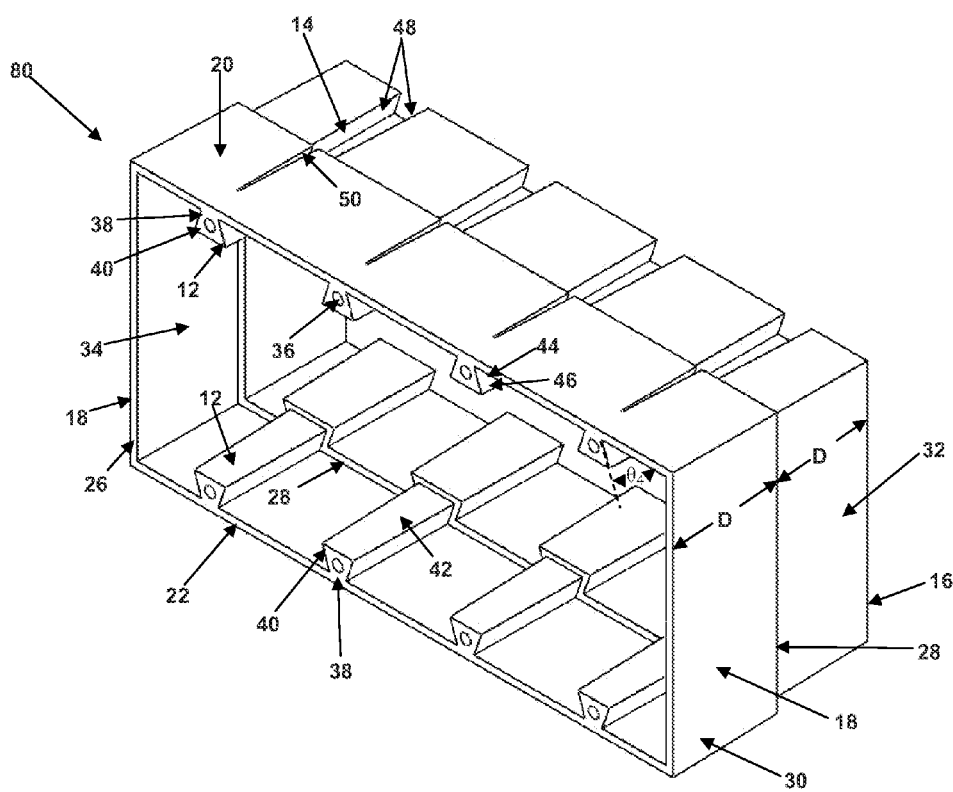
FIG. 4 is a perspective view of a preferred embodiment 4-gang electrical box.

Referring now to FIG. 4, a 4-gang electrical box 80 is shown with eight screw protrusions 12 extending inward from top wall 20 and bottom wall 22. Specifically, four screw protrusions 12 extend downward from an inner surface 34 of top wall 20, while four additional screw protrusions 12 extend upward from an inner surface 34 of bottom wall 22. Additionally, four screw boss channels 14 are formed in top wall 20 and four additional screw boss channels 14 are formed in bottom wall 22.

Similar to single-gang electrical box 10, double-gang electrical box 60, and triple-gang electrical box 70, screw protrusions 12 and screw boss channels 14 of 4-gang electrical box 80 are shaped and sized complementary to one another to allow 4-gang electrical box screw protrusions to slidingly engage 4-gang electrical box screw boss channels. In particular, 4-gang screw protrusions 12 also include sidewall 44 with outer surface 46. Nevertheless, an angle $\theta_4$ defined as the angle between sidewall 44 and top wall 20 or bottom wall 22 of the 4-gang electrical box is less than $\theta_1$, $\theta_2$, and $\theta_3$ and therefore the cross-sectional shape and size of 4-gang screw protrusions 12 are different from the single-gang screw protrusion, the double-gang screw protrusion, and the triple-gang screw protrusion. Still further, the 4-gang screw boss channel 14 is adapted to match and receive screw protrusions having an angle $\theta_4$. Accordingly, only a 4-gang screw protrusion can fit within a 4-gang screw boss channel and cannot be nested within a single-gang, a double-gang, or a triple-gang.

Figure 5:
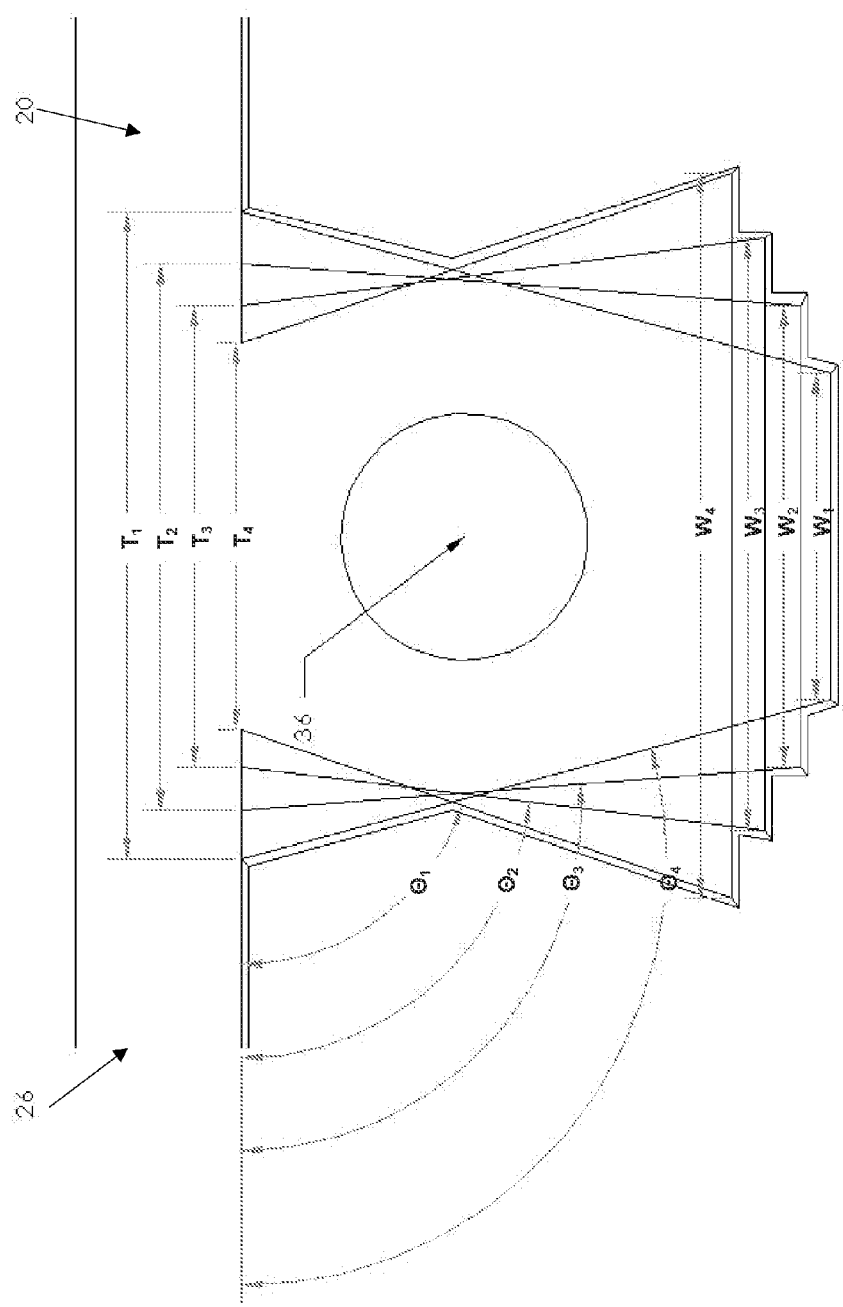
FIG. 5 is a top view single-gang, dual-gang, triple-gang, and 4-gang box mounting screw protrusions and screw channel bosses superimposed upon one another; and, FIG. 6 is a perspective view of a single-gang electrical box unable to nest within a triple-gang electric box due to incompatibility of the box mounting screw protrusions and the screw channel bosses.

FIG. 5 illustrates a view of screw protrusions 12 of a single-gang electrical box, a double-gang electrical box, a triple-gang electrical box, and a 4-gang electrical box superimposed on one another. Further, each respective angle $\theta_1$, $\theta_2$, $\theta_3$, and $\theta_4$ are shown in addition to a central intersection point for each of the screw protrusions. For example, screw protrusions of the single-gang electrical box is at least partially defined by $T_1$ and $W_1$, where $T_1$ represents the largest width of proximate portion 38 and $W_1$ represents the smallest width of distal portion 40. Similarly, double-gang electrical box screw protrusions are at least partially defined by $T_2$ and $W_2$, while triple-gang electrical box screw protrusions are at least partially defined by $T_3$ and $W_3$, and 4-gang electrical box screw protrusions are at least partially defined by $T_4$ and $W_4$. Thus, it is seen that regardless of which dislike gang electrical boxes (meaning electrical boxes have a different number of gangs) a user attempts to connect, there will be sufficient interference to prevent mating of the dislike screw protrusions and screw boss channels.

A particular embodiment of a single-gang screw protrusion and screw boss channel (not shown in FIG. 5) has proximate width 38 of $T_1$ that is larger than distal width 40 of $W_1$. Similarly, a particular embodiment of a double-gang screw protrusion and screw boss channel (not shown) has proximate width 38 of $T_2$ that is slightly larger than distal width 40 of $W_2$. Further, a particular embodiment of a triple-gang screw protrusion and screw boss channel (not shown) has proximate width 38 of $T_3$ that is slightly smaller than distal width 40 of $W_3$. Finally, a particular embodiment of a 4-gang screw protrusion and screw boss channel (not shown) has proximate width 38 of $T_4$ that is smaller than distal width 40 of $W_4$. While the description and Figures illustrate particular embodiments and implementations, and specific sizes, shapes, and configurations of the screw protrusions and screw boss channels, it is within the spirit and scope of the present disclosure to incorporate any suitable size, shape, and configuration so long as electrical boxes that are designed to mate together have complementary screw protrusions and screw boss channels while each varying subset of electrical boxes has a different size, shape, or configuration. The term subset is used to define a group of electrical boxes that are nestable within one another and does not necessarily require that they have the same number of gangs.

Figure 6:
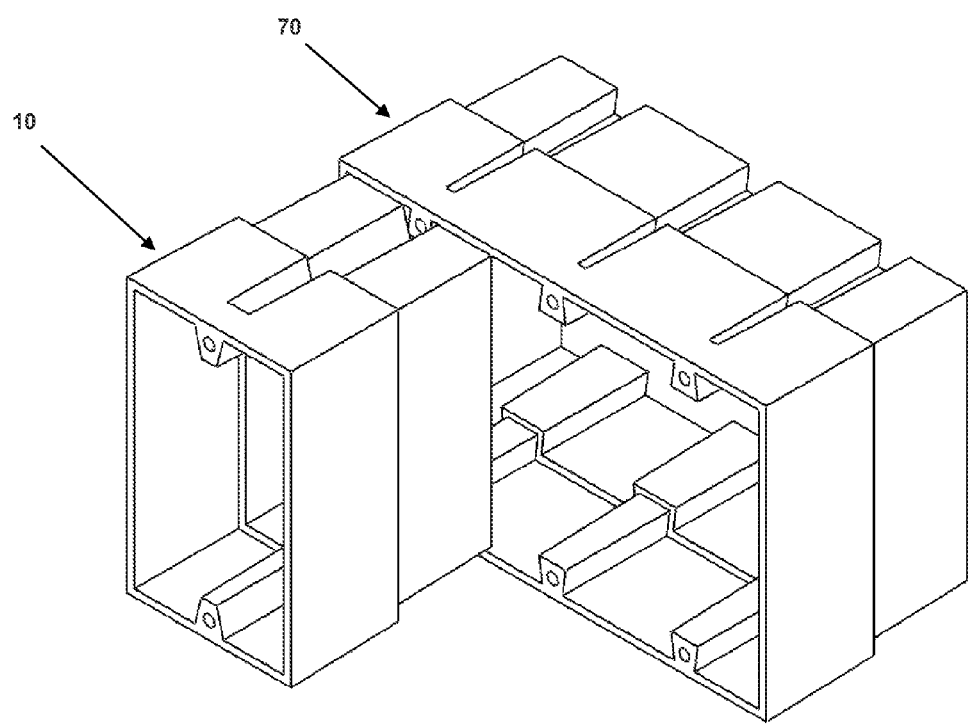

Referring now to FIG. 6, a user is attempting to nest single-gang electrical box 10 within triple-gang electrical box 70. In particular, a user is locating screw boss channel 14 and back wall 22 of single-gang electrical box 10 near front surface 26 and screw protrusions 12 of triple-gang electrical box 10. For example, screw protrusions 12 on top wall 20 and bottom wall 22 of the triple-gang electrical box are each aligned with screw boss channels 14 on top wall 20 and bottom wall 22 of the single-gang electrical box but the single-gang unit is not nestable within the triple-gang unit because the screw protrusions and screw boss channels are incompatible with one another. Thus it is seen that nesting can be achieved to selectively increase shipping density while ensuring that only like-ganged electrical boxes are nested within one another. While particular embodiments have been illustrated and described as nesting only like-ganged electrical boxes, it is within the spirit and scope of the present invention to selectively permit nesting of any electrical box while preventing nesting of undesired electrical boxes by utilizing incompatible screw protrusions and channel bosses.

Other shapes and configurations of electrical boxes are contemplated as well. For example, round electrical boxes (such as ceiling boxes), octagon boxes, square boxes, and any other rectilinear or curvilinear shaped boxes and the like may also be used.

In places where the description above refers to particular implementations of an electrical box, it should be readily apparent that a number of modifications may be made without departing from the spirit thereof. The disclosed implementations are, therefore, to be considered in all respects as illustrative and not restrictive. Accordingly, many additional implementations are possible. The accompanying claims are intended to cover such modifications as would fall within the true spirit and scope of the disclosure set forth in this document. All changes that come within the meaning of and range of equivalency of the claims are intended to be embraced therein.

Additionally, while the configuration and nesting of electrical box implementations have been described, it will be understood that the configuration and nesting of electrical box implementations are not limited to the specific components or steps as disclosed. Any components or steps or sequence of steps indicated herein are given as examples of possible components, steps or sequence of steps and not as limitations, since various configurations, processes and sequences of steps may be used. Other electrical box implementations may be configured and nested in similar manners.

The concepts disclosed herein are not limited to the specific implementations shown herein. For example, implementations of electrical boxes, and implementing components, may be formed of any of many different types of materials or combinations thereof that can readily be formed into shaped objects provided that the materials selected are consistent with the intended operation of electrical box implementations. For example, the components may be formed of: polymers such as thermoplastics (such as ABS, Fluoropolymers, Polyacetal, Polyamide; Polycarbonate, Polyethylene, Polypropylene (low or high density), Polysulfone, and/or the like), thermosets (such as Epoxy, Phenolic Resin, Polyimide, Polyurethane, Silicone, and/or the like), any combination thereof, and/or other like materials; composites and/or other like materials; metals and/or other like materials; alloys and/or other like materials; any other suitable material; and/or any combination of the foregoing thereof. Also, appropriate mounting fasteners, hardware and components may be provided. Those of ordinary skill in the art will readily be able to select appropriate materials and manufacture these products from the disclosures provided herein.

Furthermore, the electrical boxes, screw protrusions, screw channel bosses, and any other components forming any particular implementation of an electrical box may be manufactured simultaneously or separately and integrally joined with one another, while other components may be pre-manufactured or manufactured separately and then assembled with the integral components. Various implementations may be manufactured using conventional procedures as added to and improved upon through the principles described here. Accordingly, manufacture of these components separately or simultaneously may involve extrusion, vacuum forming, injection molding, blow molding, casting, forging, cold rolling, milling, drilling, reaming, turning, grinding, stamping, pressing, cutting, bending, welding, soldering, hardening, riveting, punching, and/or the like. Components manufactured separately may then be coupled or removably coupled with the other integral components, if necessary, in any manner, such as with adhesive, a weld joint, a solder joint, a fastener (e.g. a bolt, a bolt and a nut, a screw, a rivet, a pin, and/or the like), washers, retainers, any combination thereof, and/or the like for example, depending on, among other considerations, the particular material forming the components. Other possible steps might include sand blasting, polishing, powder coating, zinc plating, anodizing, hard anodizing, and/or painting the components for example.

For example, via injection molding, versions of electrical boxes can be made by the use of a dedicated tool (e.g., a mold) for each version or by making one tool with a specific set of first version cavities, a specific set of second version cavities, a specific set of third version cavities, and the like.

One particular benefit that may be found in particular implementations of electrical boxes disclosed in this document is the value added from being able to store and transport identical electrical boxes in a nested condition. By significantly reducing the transport size, the transport and storage cost is also significantly reduced. Further, inventory can be more closely controlled by ensuring that only similarly situated electrical boxes are stored and or shipped together.

The invention claimed is:

1. A system of electrical boxes, comprising:
   a first plurality of similarly sized electrical boxes each comprising:
      four box side walls extending from a back wall to an open front, each of the four box side walls having an inner surface and an outer surface;
      a shoulder positioned between the back wall and the open front, the shoulder extending around the four box side walls and dividing the electrical box into a front portion that extends from the open front to the shoulder and a rear portion sized to nest within the open front of a different electrical box of the first plurality of electrical boxes;
      one or more screw protrusions protruding inwardly from the inner surface of two opposing box side walls of the four box side walls, each of the one or more screw protrusions extending from the open front to at least the shoulder and comprising a proximate portion having a first width adjacent the inner surface, a distal portion opposite the proximate portion and having a second width different than the first width, and two opposing non-parallel screw protrusion side walls extending between the proximate portion and the distal portion;
      said protrusion side walls configured to fit within one or more corresponding screw boss channels on the outer surface of each of the two opposing box side walls of the four side walls, each of the one or more screw boss channels comprising two opposing channel walls angled complementary to the screw protrusion sidewalls such that the one or more screw protrusions fit within the one or more screw boss channels of a different electrical box of the first plurality of electrical boxes when nested.

2. The system of electrical boxes of claim 1, wherein:
   the one or more screw protrusions protruding inwardly from the inner surface of two opposing box side walls of the four box side walls of the first plurality of electrical boxes comprises one screw protrusion protruding inwardly from the inner surface of the two opposing box side walls of the four box side walls of the first plurality of electrical boxes; and the one or more screw boss channels on the outer surface of each of the two opposing box side walls comprises one screw boss channel on the outer surface of each of the two opposing box side walls.

3. The system of electrical boxes of claim 2, further comprising a second plurality of similarly sized electrical boxes, each electrical box of the second plurality of electrical boxes comprising:
- four box side walls extending from a back wall to an open front, each of the four box side walls comprising an inner surface and an outer surface;
- a shoulder positioned between the back wall and the open front, the shoulder extending around the four box side walls and dividing the electrical box into a front portion that extends from the open front to the shoulder and a rear portion sized to nest within the open front portion of a different electrical box of the second plurality of electrical boxes;
- two or more screw protrusions protruding inwardly from the inner surface of two opposing box side walls of the four box side walls, each of the two or more screw protrusions extending from the open front to at least the shoulder and comprising a proximate portion adjacent the inner surface and having a third width different from the first width, a distal portion opposite the proximate portion and having a fourth width different than the third width, and two opposing screw protrusion side walls extending between the proximate portion and the distal portion;
- two or more screw boss channels on the outer surface of each of the two opposing box side walls of the four side walls, each of the two or more screw boss channels comprising two opposing channel walls angled complementary to the screw protrusion sidewalls of the second plurality of electrical boxes such that the two or more screw protrusions of the second plurality of electrical boxes fit within the two or more screw boss channels of a different electrical box of the second plurality of electrical boxes, and the one or more screw protrusions of the first plurality of electrical boxes do not fit within the any of the two or more screw boss channels of the second plurality of electrical boxes.

4. The system of electrical boxes of claim 3, wherein:
the two or more screw protrusions protruding inwardly from the inner surface of two opposing box side walls of the four box side walls of the first plurality of electrical boxes comprise two screw protrusions protruding inwardly from the inner surface of the two opposing box side walls of the four box side walls of the first plurality of electrical boxes; and
the two or more screw boss channels on the outer surface of each of the two opposing box side walls comprise two screw boss channels on the outer surface of each of the two opposing box side walls.

5. The system of electrical boxes of claim 4, further comprising a third plurality of similarly sized electrical boxes, each electrical box the third plurality of electrical boxes comprising:
- four box side walls extending from a back wall to an open front, each of the four box side walls comprising an inner surface and an outer surface;
- a shoulder positioned between the back wall and the open front, the shoulder extending around the four box side walls and dividing the electrical box into a front portion that extends from the open front to the shoulder and a rear portion sized to nest within the front portion of a different electrical box of the third plurality of electrical boxes;
- three or more screw protrusions protruding inwardly from the inner surface of two opposing box side walls of the four box side walls, each of the three or more screw protrusions extending from the open front to at least the shoulder and comprising a proximate portion adjacent the inner surface and comprising a fifth width different from the first and third widths, a distal portion opposite the proximate portion and comprising a sixth width different than the fifth width, and two opposing screw protrusion side walls extending between the proximate portion and the distal portion;
- three or more screw boss channels on the outer surface of each of the two opposing box side walls of the four side walls, each of the three or more screw boss channels comprising two opposing channel walls angled complementary to the screw protrusion sidewalls of the third plurality of electrical boxes such that the two or more screw protrusions of the third plurality of electrical boxes fit within the two or more screw boss channels of a different electrical box of the third plurality of electrical boxes, and the one or more screw protrusions of the first and second pluralities of electrical boxes do not fit within the any of the three or more screw boss channels of the third plurality of electrical boxes.

6. The system of claim 5, further comprising a plurality of secondary channels on the outer surface of each of the first, second, and third plurality of electrical boxes, each of the plurality of secondary channels extending from the shoulder at least partially towards the open front and aligned with a different screw boss channel.

7. The system of claim 6, wherein each screw protrusion of the first, second, and third plurality of electrical boxes widens as it extends from the open front towards the shoulder.

8. The system of claim 7, wherein each screw boss channel of the first, second, and third plurality of electrical boxes narrows as it extends from the back wall toward the shoulder.

9. The system of claim 6, further comprising:
- a first angle between the inner surface and each of the screw protrusion side walls of the first plurality of electrical boxes;
- a second angle between the inner surface and each of the screw protrusion side walls of the second plurality of electrical boxes, the second angle different than the first angle; and
- a third angle between the inner surface and each of the screw protrusion side walls of the third plurality of electrical boxes, the third angle different than the first angle.

10. A system of electrical boxes, comprising:
- a first plurality of similarly sized electrical boxes each comprising:
  - four side walls extending from a back wall to an open front, the back wall sized to fit through the open front and at least partially nest within an open front of another electrical box of the first plurality of electrical boxes;
  - at least two screw protrusions extending inwardly from an inner surface of each box, each of the at least two screw protrusions comprising opposing non-parallel screw protrusion side walls extending from the inner surface to a distal portion of the two screw protrusions; and
  - said screw protrusions configured to fit within a corresponding screw boss channel on an outer surface of each box, the screw boss channel comprising opposing non-parallel channel walls angled complementary to the screw protrusion side walls and positioned to receive the at least two screw protrusions of another electrical box of the first plurality of electrical boxes when another electrical box of the plurality of first electrical boxes is at least partially nested within the electrical box.

11. The system of claim 10, wherein the at least two screw protrusions and the screw boss channels of the first plurality of electrical boxes comprises two screw protrusions and two screw boss channels.

12. The system of claim 11, further comprising a second plurality of similarly sized electrical boxes each comprising:
four side walls extending from a back wall to an open front, the back wall sized to fit through the open front and at least partially nest within the open front of another electrical box of the second plurality of electrical boxes;
at least four screw protrusions extending inwardly from an inner surface of each box, each of the at least four screw protrusions comprising opposing non-parallel screw protrusion side walls angled differently than the non-parallel screw protrusion side walls of the first plurality of electrical boxes and extending from the inner surface to a distal portion of the at least four screw protrusions; and
at least four screw boss channels on an outer surface of each box, each of the at least four screw boss channels comprising opposing non-parallel channel walls angled complementary to the screw protrusion walls of the second plurality of electrical boxes and positioned to receive the at least four screw protrusions of another electrical box of the second plurality of electrical boxes when another electrical box of the second plurality of electrical boxes is at least partially nested within the open front of the electrical box, the non-parallel channel walls of the second plurality of electrical boxes angled to prevent reception of the two screw protrusions of the first plurality of electrical boxes.

13. The system of claim 12, wherein the at least four screw protrusions and the at least four screw boss channels of the second plurality of electrical boxes comprise four screw protrusions and four screw boss channels.

14. The system of claim 13, further comprising a third plurality of electrical boxes, each comprising:
four side walls extending from a back wall to an open front, the back wall sized to fit through the open front and at least partially nest within the open front of another electrical box of the third plurality of electrical boxes;
at least six screw protrusions extending inwardly from an inner surface of each box, each of the at least six screw protrusions comprising opposing non-parallel screw protrusion side walls angled differently than the non-parallel screw protrusion side walls of the first and second pluralities of electrical boxes and extending from the inner surface to a distal portion of the at least four screw protrusions; and
at least six screw boss channels on an outer surface of each box, each of the at least four screw boss channels comprising opposing non-parallel channel walls angled complementary to the screw protrusion side walls of the third plurality of electrical boxes and positioned to receive the at least six screw protrusions of another electrical box of the third plurality of electrical boxes when another electrical box of the third plurality of electrical boxes is at least partially nested within the electrical box, the non-parallel channel walls of the third plurality of electrical boxes angled to prevent reception of the two screw protrusions of the first plurality of electrical boxes and the four screw protrusions of the second plurality of electrical boxes.

15. The system of claim 14, further comprising:
a first angle between the inner surface and each of the screw protrusion side walls of the first plurality of electrical boxes;
a second angle between the inner surface and each of the screw protrusion side walls of the second plurality of electrical boxes, the second angle different than the first angle; and
a third angle between the inner surface and each of the screw protrusion side walls of the third plurality of electrical boxes, the third angle different than the first angle.

16. The system of claim 15, wherein each screw protrusion of the first, second, and third plurality of electrical boxes widens as it extends from the open front towards the back wall.

17. The system of claim 16, wherein each screw boss channel of the first, second, and third plurality of electrical boxes narrows as it extends from the back wall towards open front.

18. A method of stacking electrical boxes, comprising:
aligning at least two screw protrusions of a first electrical box of a first plurality of electrical boxes with at least two screw boss channels of a second electrical box of the first plurality of electrical boxes, each of the at least two screw protrusions comprising opposing non-parallel screw protrusion walls and each of the at least two screw boss channels comprising non-parallel channel walls angled complementary to the non-parallel screw protrusion walls of first electrical box of the first plurality of electrical boxes to mate with a respective screw protrusion; and
inserting the at least two screw protrusions of the first electrical box into the at least two screw boss channels of the second electrical box to at least partially nest the second electrical box within an open front of the first electrical box.

19. The method of claim 18, further comprising:
aligning at least four screw protrusions of a third electrical box of a second plurality of electrical boxes with at least four screw boss channels of a fourth electrical box of the second plurality of electrical boxes, each of the at least four screw protrusions of the third electrical box comprising opposing non-parallel screw protrusions walls angled differently than the non-parallel channel walls of the first electrical box, and each the at least four screw boss channels of the fourth electrical box comprising non-parallel channel walls angled complementary to the non-parallel screw protrusion walls of the third electrical box and differently than the non-parallel channel walls of the second electrical box;
inserting the at least four screw protrusions of the third electrical box into the at least four screw boss channels of the fourth electrical box to at least partially nest the third electrical box within an open front of the fourth electrical box; and
preventing nesting of the second electrical box with the third electrical box by aligning the at least two screw boss channels of the second electrical box with two of the at least four screw protrusions of the third electrical box.

20. The method of claim 19, further comprising:
aligning at least six screw protrusions of a fifth electrical box of a third plurality of electrical boxes with at least six screw boss channels of a sixth electrical box of the third plurality of electrical boxes, each of the at least six screw protrusions of the fifth electrical box comprising opposing non-parallel screw protrusions walls angled differently than the non-parallel channel walls of the first and third electrical boxes, and the at least six screw boss channels of the sixth electrical box comprising non-parallel channel walls angled complementary to the non-parallel screw protrusion walls of the fifth electrical box and differently than the non-parallel channel walls of the second and fourth electrical boxes;

inserting the at least six screw protrusions of the fifth electrical box into the at least six screw boss channels of the sixth electrical box to at least partially nest the fifth electrical box within the sixth electrical box;

preventing nesting of the second electrical box with the fifth electrical box by aligning the at least two screw boss channels of the second electrical box with two of the at least six screw protrusions of the fifth electrical box; and preventing nesting of the fourth electrical box with the fifth electrical box by aligning the at least four screw boss channels of the second electrical box with four of the at least six screw protrusions of the fifth electrical box.

\* \* \* \* \*